(12) United States Patent
D'Amato et al.

(10) Patent No.: US 8,352,148 B2
(45) Date of Patent: Jan. 8, 2013

(54) SYSTEM FOR CONTROLLING INPUT PROFILES OF COMBINED CYCLE POWER GENERATION SYSTEM

(75) Inventors: Fernando Javier D'Amato, Niskayuna, NY (US); Darrin Glen Kirchhof, Schenectady, NY (US); Dean Alexander Baker, Clifton Park, NY (US); Ramu Sharat Chandra, Niskayuna, NY (US); Daniel Francis Holzhauer, Burnt Hills, NY (US); Christopher Eugene Long, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 1024 days.

(21) Appl. No.: 12/124,316

(22) Filed: May 21, 2008

(65) Prior Publication Data

US 2009/0292436 A1    Nov. 26, 2009

(51) Int. Cl.
*G06F 19/00* (2011.01)

(52) U.S. Cl. ............. 701/100; 701/99; 700/287; 60/646

(58) Field of Classification Search ............. 700/28–36, 700/40, 44, 45, 286–288; 701/100, 36, 99; 703/18; 706/907
See application file for complete search history.

(56) References Cited

U.S. PATENT DOCUMENTS

| | | | |
|---|---|---|---|
| 4,222,229 A | 9/1980 | Uram | |
| 5,042,246 A | 8/1991 | Moore et al. | |
| 5,347,446 A * | 9/1994 | Iino et al. | 700/29 |
| 5,886,895 A * | 3/1999 | Kita et al. | 700/28 |
| 6,278,899 B1 * | 8/2001 | Piche et al. | 700/44 |
| 6,370,880 B1 | 4/2002 | Smith et al. | |
| 6,591,225 B1 * | 7/2003 | Adelman et al. | 702/182 |
| 6,681,155 B1 * | 1/2004 | Fujita et al. | 700/287 |
| 7,058,552 B2 * | 6/2006 | Stothert et al. | 703/2 |
| 7,206,644 B2 | 4/2007 | Iino et al. | |
| 7,330,767 B2 * | 2/2008 | Thiele et al. | 700/29 |
| 7,356,383 B2 * | 4/2008 | Pechtl et al. | 700/288 |

(Continued)

FOREIGN PATENT DOCUMENTS

JP    8128305 A    5/1996

(Continued)

OTHER PUBLICATIONS

C. Albanesi et al., "Optimization of the Start-up Procedure of a Combined Cycle Power Plant," Proceedings of the 45th IEEE Conference on Decision & Control, San Diego, California, Dec. 13-15, 2006, pp. 1840-1845.

(Continued)

*Primary Examiner* — Gertrude Arthur Jeanglaude
(74) *Attorney, Agent, or Firm* — Ann M. Agosti

(57) ABSTRACT

A control system for a combined cycle power generation system including a gas turbine engine (GT), a heat recovery steam generator (HRSG), and a steam turbine (ST) includes a display wherein an operator may observe information about predicted operating parameters; a user interface wherein an operator may provide additional operating constraints; and a controller configured to generate input profiles of the GT, the HRSG, and the ST that satisfy the nominal constraints and any additional constraints and to generate the information about the predicted operating parameters. The controller may be configured to detect a stage transition of power generation system operation and update the input profiles. The controller may be configured to generate alternative operating scenarios by mapping alternative control actions to an operating constraint of at least one of the system components.

18 Claims, 3 Drawing Sheets

U.S. PATENT DOCUMENTS

| | | | |
|---|---|---|---|
| 7,426,456 B2* | 9/2008 | Alvarez et al. | 703/2 |
| 7,567,859 B2* | 7/2009 | Subramanian et al. | 700/288 |
| 7,584,024 B2* | 9/2009 | Wroblewski et al. | 700/300 |
| 2003/0086520 A1* | 5/2003 | Russell et al. | 376/259 |
| 2004/0102872 A1* | 5/2004 | Schick et al. | 700/286 |
| 2004/0102890 A1 | 5/2004 | Brunell | |
| 2006/0184945 A1 | 8/2006 | Murase et al. | |
| 2006/0233637 A1 | 10/2006 | Yakushi et al. | |
| 2007/0005392 A1 | 1/2007 | Claremont et al. | |
| 2007/0055392 A1* | 3/2007 | D'Amato et al. | 700/44 |
| 2007/0261012 A1 | 11/2007 | Matsuda et al. | |
| 2008/0027616 A1 | 1/2008 | Zhang et al. | |

FOREIGN PATENT DOCUMENTS

| | | |
|---|---|---|
| JP | 2004027890 A | 1/2004 |
| JP | 2004116416 A | 4/2004 |

OTHER PUBLICATIONS

J. Delson, Thermal, Stress Computation for Steam-Electric Generator Dispatch, IEEE Transactions on Power Systems, vol. 9, No. 1, Feb. 1994, pp. 120-127.

J. Bausa et al., "Dynamic Optimization of Startup and Load-Increasing Processes in Power Plants—Part I: Method," Journal of Engineering for Gas Turbines, Transactions of the ASME, vol. 123, Jan. 2001, pp. 246-250.

J. Bausa et al., "Dynamic Optimization of Startup and Load-Increasing Processes in Power Plants—Part II: Appplication," Journal of Engineering for Gas Turbines and Power, Transactions of the ASME, vol. 123, Jan. 2001, pp. 251-254.

F. Casella et al., "Fast Start-up of a Combine-Cycle Power Plant: a Simulation Study with Modelica," The Modelica Association, Sep. 4-5, pp. 3-10.

E. Gallestey et al., "Model Predictive Control and the Optimization of Power Plant Load While Considering Lifetime Consumption," IEEE Transactions on Power systems, vol. 17, No. 1, Feb. 2002, pp. 186-191.

Y. Ohsawa et al., "Startup Optimization of a Combined Cycle Power Plant Based on Cooperative Fuzzy Reasoning and a Neural Network," IEEE Transactions on Energy Conversion, vol. 12, No. 1, Mar. 1997, pp. 51-59.

T. Iijima et al., "Hitachi's Latest Supervisory and Control System for Advanced Combined Cycle Power Plants," Hitachi Review, vol. 51, No. 5, 2002, pp. 153-157.

"Optimizing Generation Control for Combined-Cycle Plants," GE's closed loop generation control helps balance power/steam demand—http://www.gepowercom/prod_serv/serv/op_maint_serv/en/downloads/closed_loop_optimal.pdf, Diesel & Gas Turbine Worldwide, Power-Gen International—Orlando, Dec. 2004.

"Solutions for Combined Cycle Power Plants," ABB Ltd. Business Unit Power Generation, 2006, pp. 1-8.

D. F. Holzhauer et al., "Systems and Methods for Channeling Steam Into Turbines," U.S. Appl. No. 12/040,296, filed Feb. 29, 2008.

European Search Report and Written Opinion From corresponding Application No. EP09159972, mailed on Apr. 7, 2011.

D. Saez et al., "Fuzzy Predictive Supervisory Control Based on Genetic Algorithms for Gas Turbines of Combined Cycle Power Plants," IEEE Transactions on Energy Conversion, vol. 22, No. 3, pp. 689-696, Sep. 2007.

L. Kueppers et al., "Simulator for Combined-Cycle Gas Turbine Power Stations," vol. 81, No. 7, pp. 89-92, Jul. 2001.

Search Report from corresponding EP Application No. 09159972.0-2206 dated Aug. 26, 2011.

\* cited by examiner

SYSTEM FOR CONTROLLING INPUT PROFILES OF COMBINED CYCLE POWER GENERATION SYSTEM

BACKGROUND

The subject matter disclosed herein relates generally to combined-cycle (CC) power generation systems.

Increased cyclic duty requirements, higher fuel costs, competitive deregulated energy markets, and stringent environmental regulations are resulting in a demand for faster sequences from CC power generation system operations. Furthermore, power generation system owners manage different startup objectives depending on local environmental regulations, energy dispatch requirements, and current fuel and energy prices. A typical startup objective is the reduction of startup time. However, the power generation system operator may need to minimize emissions, fuel costs, or net heat rate. Additional flexibility is also useful due to some startup procedures occurring over several hours and the potential for load, market, or power system conditions to change during that time period.

Commonly assigned US20070055392, filed 6 Sep. 2005, which is herein incorporated by reference in its entirety, describes a system and method for model predictive control of a power generation system. The control system includes a model for a number of power generation system components, and the model is adapted to predict behavior of the power generation system components. The system also includes a controller that receives inputs corresponding to operating parameters of the power generation system components and improves performance criteria of the power generation system according to the model.

Some combined-cycle power systems include at least two gas turbine engines (GTs). Each GT is coupled with a heat recovery steam generator (HRSG). Exhaust gases from each GT are channeled into the corresponding HRSG to generate steam for use in other power generation system processes such as driving a steam turbine assembly (ST).

Power generation systems with multiple GTs have more flexibility when selecting a startup process than systems with only one GT. The choice of GT loads at which each HRSG is connected to the ST (connecting point) and the choice of the order in which the GTs are connected to the ST (startup sequence) may be used to achieve improved startup performance. However, the best choice from such options is not always clear. Additionally, any startup sequence must be managed while factoring in power generation system and component constraints. Several examples of constraints include maximum stresses in the ST rotor, maximum differential expansion or minimum clearances between adjacent rotating and stationary parts, and maximum metal and steam temperatures.

In many combined-cycle power system startup processes, a first GT to roll off from turning gear and fire is designated as a lead GT, and a second GT is designated as a lag gas turbine. Blending the lag GT steam into the ST sometimes produces increased temperature gradients within various ST components. Depending on the magnitude of the temperature gradients, thermal stresses may be induced or increased within the ST. If the GT loading rates are very high, large thermal gradients may be developed in the ST, leading to high stresses and uneven thermal expansion that could result in rubs. Conversely, slow GT loading rates ensure a safe operation but increase fuel costs and reduce power generation system availability.

One challenge in generating optimal power plant control actions during transient operation is dissimilar time scales of dynamics of different components. For example, during a startup process, changes in the GT effectors (like fuel valve openings and inlet air guide vane angles) modify the GT state in a matter of seconds, while the resulting effects on stresses and clearances manifest themselves after relatively longer delays, typically in the range of ten minutes to thirty minutes. If the controller does not have the capacity of accurately predicting these longer term or "future" stresses or clearances, then the applied GT loads are typically conservative and include very low load rates to prevent thermally overstressing the ST. Another transient operation consists in blending the steam generated in the lag HRSG into the ST. To prevent overstressing of the ST, at least some known combined-cycle power systems manually blend the steam generated within the lag HRSG over an extended period of time. However, slowly blending the lag steam into the ST may result in unnecessary delays to complete the blending. Sometimes, the transient operation constitutes an event that is manually controlled, and the operator has to decide when to trigger the event while ensuring future constraint (or boundary) compliance. Control guidance to trigger the event is typically conservative in the sense that unnecessarily long delays may be introduced before the event is allowed. Commonly assigned application Ser. No. 12/040,296, filed 29 Feb. 2008, describes a method for determining timing of the introduction of steam from the second HRSG to reduce this efficiency loss.

It would be useful to further improve operation of combined cycle power generation systems to improve startup conditions of the power generation systems and its components.

BRIEF DESCRIPTION

Briefly in accordance with one embodiment disclosed herein, a control system is provided for a combined cycle power generation system comprising a gas turbine engine (GT), a heat recovery steam generator (HRSG), and a steam turbine (ST) and having nominal operating constraints. The control system comprises a display wherein an operator may observe information about predicted operating parameters of the power generation system, a user interface wherein an operator may provide additional operating constraints of the power generation system, and a controller configured to receive input corresponding to any additional operating constraints and to obtain component operating parameters of the power generation system, to generate input profiles of the GT, the HRSG, and the ST that satisfy the nominal constraints and any additional constraints, and to generate the information about the predicted operating parameters of the power generation system.

In accordance with another embodiment disclosed herein, a control system is provided for a combined cycle power generation system comprising GTs, HRSGs, and a ST. The control system comprises a user interface wherein an operator may provide commands regarding a number of GTs to start, an order of starting the GTs, blending types of HRSGs to the ST, or a combination thereof, a model for the GTs, the HRSGs, and the ST configured to represent dynamics and constraints using a plurality of parameters, and an optimizer configured to receive input corresponding to the parameters and to generate input profiles of the GTs, the HRSGs and the ST that satisfy the constraints and optimize at least one power generation system operating parameter. In this embodiment, the optimizer is further configured to detect a stage transition of power generation system operation and update the input profiles.

In accordance with another embodiment disclosed herein, a control system is provided for a combined cycle power generation system comprising GTs, HRSGs, and a ST. The control system comprises a controller configured to obtain component parameters of the power generation system, to generate input profiles of the GTs, the HRSGs, and the ST, and to generate alternative operating scenarios by mapping alternative control actions to an operating constraint of at least one of the GTs, at least one of the HRSGs, the ST, or a combination of any of the foregoing.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
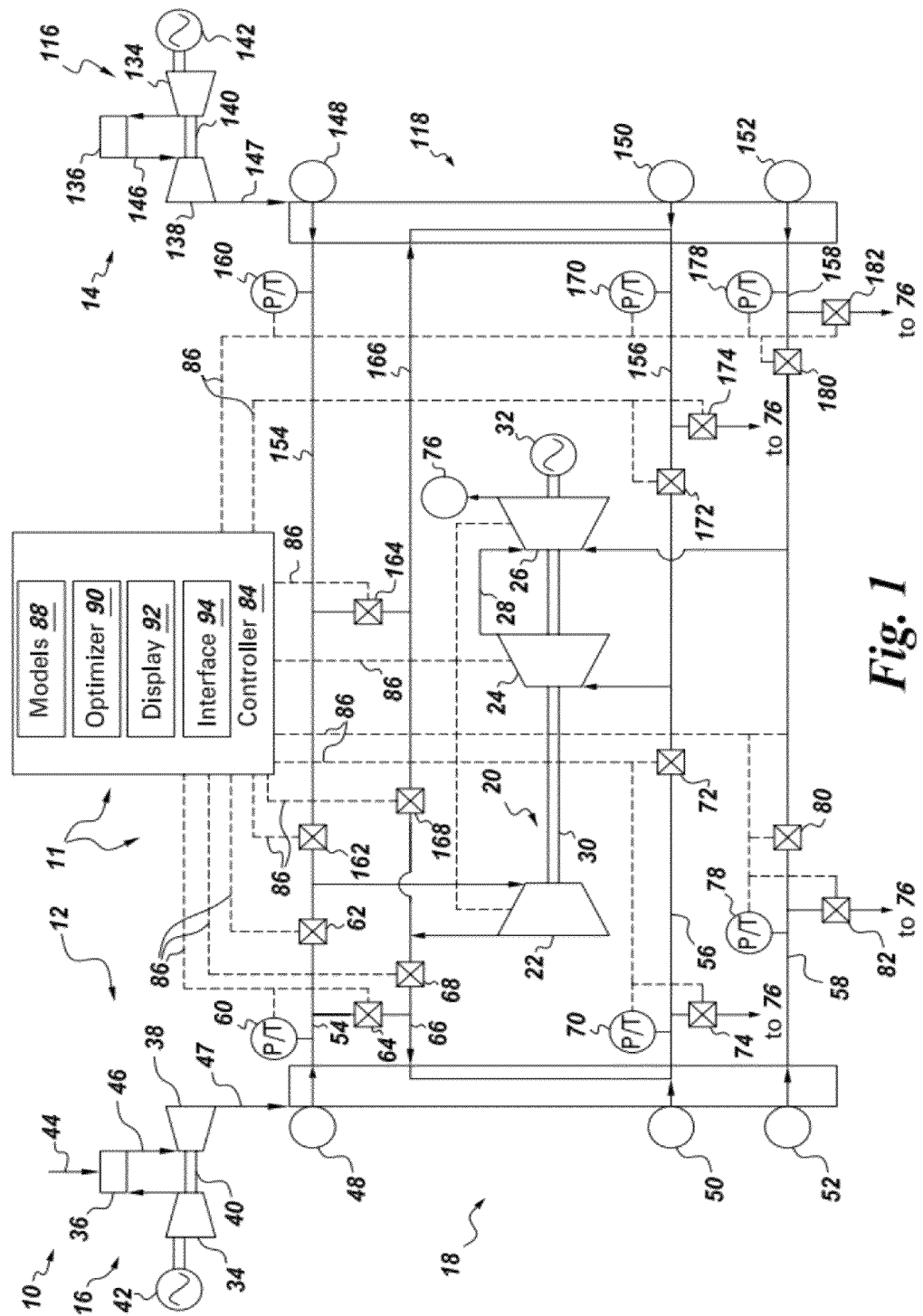
FIG. 1 is a schematic diagram of an exemplary combined-cycle power system in accordance with one embodiment disclosed herein.

FIG. 1 is a schematic diagram of an exemplary combined-cycle power generation system 10. Generally, system 10 includes a lead side 12 and a lag side 14. Lead side 12 includes a gas turbine engine (GT) 16 that is coupled in flow communication with a heat recovery steam generator (HRSG) 18. HRSG 18 is coupled in flow communication with a steam turbine assembly (ST) 20. ST 20 includes a high pressure (HP) turbine 22, an intermediate pressure (IP) turbine 24, and a low pressure (LP) turbine 26. IP turbine 24 is coupled in flow communication to LP turbine 26 using an IP-to-LP crossover header 28. Turbines 22, 24, and 26 are each coupled to a rotor shaft 30 that is also coupled to an electric generator 32.

In the embodiment of FIG. 1, lead GT 16 includes a compressor 34, a combustor 36, and a turbine 38. Compressor 34 is coupled in flow communication with combustor 36, which is coupled in flow communication upstream from turbine 38. Compressor 34 and turbine 38 are each coupled to a rotor shaft 40 that is coupled to an electric generator 42. During operation, air entering GT 16 is compressed by compressor 34 and is then channeled to combustor 36. Combustor 36 receives fuel 44 from a fuel source (not shown) and mixes the fuel 44 and air to ignite the mixture to form hot combustion gases 46. Combustion gases 46 are channeled to turbine 38 to impart rotation thereof. Rotation of turbine 38 causes shaft 40 to rotate generator 42, which generates electricity. Combustion gases 47 are discharged from turbine 38 and channeled to HRSG 18 to facilitate heating water channeled therethrough such that steam is generated within HRSG 18.

HRSG 18 may comprise any appropriate type of HRSG. In one example, HRSG 18 includes an HP drum 48, an IP drum 50, and an LP drum 52. HP drum 48 is coupled in flow communication with an HP steam header 54 to enable HP steam to be channeled to HP turbine 22. IP drum 50 is coupled in flow communication with an IP steam header 56 to enable IP steam, or hot reheat steam, to be channeled to IP turbine 24. LP drum 52 is coupled in flow communication with an LP steam header 58 to enable LP steam to be channeled to LP turbine 26.

HP steam header 54 is shown as including a pressure and temperature (PT) sensor 60, a HP isolation valve 62, and a HP bypass valve 64. PT sensor 60 measures the pressure and temperature of the HP steam within HP steam header 54 and/or HP drum 48. HP steam header 54 may be coupled in flow communication with HP turbine 22 via a HP isolation valve 62, and/or a cold reheat steam header 66 via a HP bypass valve 64. HP isolation valve 62 may either opened to enable HP steam to be channeled to HP turbine 22 or closed to substantially prevent HP steam from being channeled to HP turbine 22. Alternatively, HP isolation valve 62 may be variably adjusted to facilitate channeling at least a portion of the HP steam to HP turbine 22. HP bypass valve 64 may comprise a throttling-type valve that meters an amount of HP steam channeled to cold reheat steam header 66.

Cold reheat steam header 66 includes a cold reheat isolation valve 68 and may be coupled in flow communication with HRSG 18. In one exemplary embodiment, cold reheat isolation valve 68 is coupled between HP turbine 22 and HRSG 18 to facilitate controlling the flow of cold reheat steam discharged from HP turbine 22 and channeled to HRSG 18.

In the embodiment of FIG. 1, IP steam header 56 includes a PT sensor 70, a hot reheat IP isolation valve 72, and a IP bypass valve 74. PT sensor 70 measures the pressure and temperature of the IP steam within IP steam header 56 and/or IP drum 50. IP steam header 56 is coupled in flow communication with IP turbine 24 via a hot reheat IP isolation valve 72, and/or a condenser 76 via a IP bypass valve 74. IP isolation valve 72 may either opened to channel IP steam to IP turbine 24 or closed to substantially prevent IP steam from being channeled to IP turbine 24. Alternatively, IP isolation valve 72 may be adjusted to multiple positions to facilitate channeling at least a portion of the IP steam to IP turbine 24. IP bypass valve 74 may be a throttling-type valve that meters an amount of IP steam channeled to condenser 76.

LP steam header 58, in the exemplary embodiment, includes a PT sensor 78, a LP isolation valve 80, and a LP bypass valve 82. PT sensor 78 measures the pressure and temperature of the LP steam within LP steam header 58 and/or LP drum 52. LP steam header 58 may be coupled in flow communication with LP turbine 26 via a LP isolation valve 80, and/or condenser 76 via a LP bypass valve 82. LP isolation valve 80 may either opened to facilitate channeling LP steam to LP turbine 26, or is closed to substantially prevent LP steam from being channeled to LP turbine 26. Alternatively, LP isolation valve 80 may be adjusted to multiple positions to meter an amount of LP steam channeled to LP turbine 26. LP bypass valve 82 may comprise a throttling-type valve that meters an amount of LP steam channeled to condenser 76.

In the exemplary embodiment, lag side 14 includes a GT 116 coupled in flow communication with a HRSG 118 to facilitate generating a steam for ST 20. HRSG 118 is coupled in flow communication with ST 20. GT 116 may comprise an engine substantially identical to lead GT 16 with corresponding numbers of elements (compressor 134, combustor 136, turbine 138, rotor shaft 140, electric generator 142, and combustion gasses 146 and 147) which will therefore not be discussed in detail herein. Likewise, HRSG 118, may comprise a HRSG similar to HRSG 18 such that the following element numbers will not be discussed in detail: HP drum 148, IP drum 150, LP drum 152, HP steam header 154, IP steam header 156, LP steam header 158, PT sensor 160, HP isolation valve 162, HP bypass valve 164, cold reheat steam header 166, cold reheat isolation valve 168, PT sensor 170, hot reheat IP isolation valve 172, IP bypass valve 174, condenser 76, PT sensor 178, LP isolation valve 180, and LP bypass valve 182.

System 10 also includes a controller 84 that is coupled in communication to a plurality of components, including but not limited to, isolation valves 62, 68, 72, 80, 162, 168, 172, and 180, bypass valves 64, 74, 82, 164, 174, and 182, turbines 22, 24, and 26, and PT sensors 60, 70, 78, 160, 170, and 178. Controller 84 sends and/or receives signals from the components in system 10. Controller 84 may comprise any suitable controller that enables system 10 to function as described herein. In the exemplary embodiment, controller 84 is a processor-based system that includes engine control software that configures controller 84 to perform the below-described processes. Processors broadly include to computers, processors, microcontrollers, microcomputers, programmable logic controllers, application specific integrated circuits, and other programmable circuits. Controller 84 typically also includes a memory (not shown), a plurality of input channels (not shown), and a plurality of output channels (not shown).

In the exemplary embodiment, controller 84 is coupled in communication to system components via a plurality of wire couplings 86 that enable data transmission. In an alternative embodiment, controller 84 is coupled to system components wirelessly via transceivers or any other wireless communication device that enables system 10 to function as described herein. In another embodiment, controller 84 may be remotely located and may communicate with the components of system 10 via a network.

Controller 84 receives a plurality of inputs from the system components, processes the inputs, generates appropriate outputs based on a programmed algorithm and/or discrete circumstances, and transmits signals to the appropriate system components to control those components. In the exemplary embodiment, controller 84 utilizes a predictive algorithm. In one embodiment, controller 84 utilizes a model predictive control (MPC) algorithm such as is described in aforementioned US20070055392. Alternatively, controller 84 may utilize any algorithm and/or program that enables system 10 to function as described herein. In one exemplary embodiment, the algorithm predicts the future temperature gradients, pressure differences, or stress within ST 20 components in the event the lag steam generated in lag HRSG 118 is channeled or blended into ST 20.

In the exemplary embodiment, controller 84 controls system components to enable steam generated by lead and lag GTs 16 and 116 to be channeled into ST 20 without overstressing any components within ST 20. More specifically, controller 84 facilitates reducing the stresses generated within ST 20 to levels that are within the predetermined operating constraints of ST 20. Moreover, in some embodiments, controller 84 facilitates minimizing the amount of time required to blend the lag steam into ST 20. As such, controller 84 facilitates preventing overstressing ST 20 and facilitates increasing the operational efficiency and life-span of ST 20.

In an exemplary embodiment, a sufficient amount of lead steam is supplied to ST 20 to facilitate powering ST 20. In one embodiment, HRSG 18 is the lead HSRG. Accordingly, engine 116 and HRSG 118 are used as lag components. Once a lead GT 16 is designated, operation of GT 16 is initiated such that combustion gases 46 are channeled to HRSG 18. Prior to channeling steam from HRSG 18 into ST 20, a sufficient amount of steam pressure is generated within headers 54, 56, and 58. In the exemplary embodiment, controller 84 controls the pressure within lead HP, IP, and LP headers 54, 56, and 58 by selectively positioning isolation valves 62, 72, and 80 and bypass valves 64, 74, and 82. More specifically, in the exemplary embodiment, controller 84 controls HP isolation valve 62 and HP bypass valve 64 using logical HP setpoints SP1 and SP2 as described in aforementioned U.S. application Ser. No. 12/040,296, which is herein incorporated by reference in its entirety.

In the exemplary embodiment, once lead GT 16 and lead HRSG 18 are producing a sufficient flow of steam to power HP turbine 22, bypass valve 64 is closed, and an inlet pressure control (IPC) logical programmed within controller 84 sends a TRUE logical (not shown) to controller 84. Once the TRUE IPC logical is received, controller 84 begins using HP, IP, and LP setpoints SP2 for controlling steam pressure within respective lead HP, IP, and LP steam headers 54, 56, and 58. Once controller 84 receives the TRUE logical from the IPC, controller 84 activates the model predictive control algorithm, which begins to calculate a maximum predicted stresses of ST 20 in the event that lag steam is blended into ST 20. One method for blending GT 116 and HRSG 118 by operation of the valves is additionally described in aforementioned U.S. application Ser. No. 12/040,296. In addition to valve operation, as described in aforementioned U.S. application Ser. No. 12/040,296, a chemical composition of the lead and lag steam may be determined, and controller 84 may determine whether it is permissible to blend the lag steam into the lead steam based on the chemical composition of the lead and lag steam.

Other optional constraints that may be obtained by the controller, as described in aforementioned U.S. application Ser. No. 12/040,296, include the temperatures of ST 20 components including but not limited to, a surface temperature and a bore temperature of HP turbine 22 and IP turbine 24; a current stress rate of change within ST 20; and the rate at which the temperature of ST 20 components are changing; a predicted stress within the ST 20 in the event the lag steam is channeled into ST 20; the maximum predicted stress of ST 20 using the predictive algorithm, in the event that lag stream is blended into ST 20; the maximum predicted stress within ST 20 based on the determined temperatures of ST 20 and pressures and temperatures of lag UP and IP steam headers 154 and 156; the maximum predicted stress of ST 20 within a specified time into the future.

Figure 2:
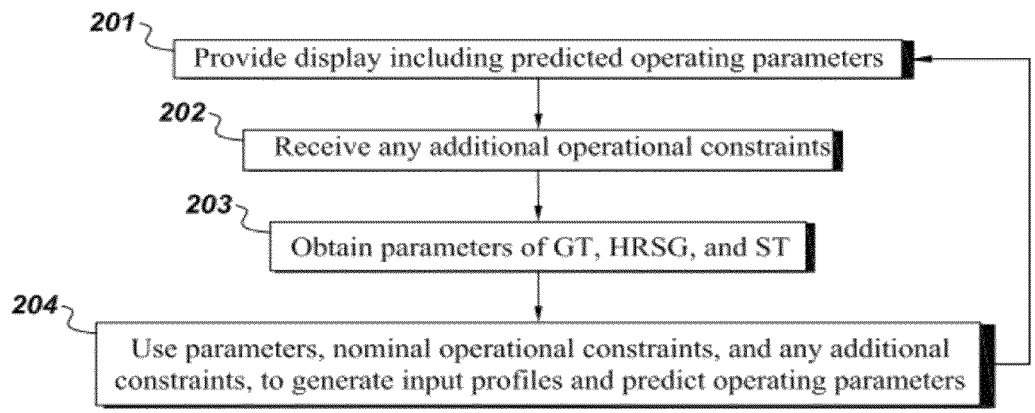
FIG. 2 is a flow diagram in accordance with one aspect disclosed herein.

In one control embodiment represented by FIGS. 1 and 2, a control system 11 for combined cycle power generation system 10 comprises a display 92 wherein an operator may observe information about predicted operating parameters of power generation system 10 (FIG. 2, step 201); a user interface 94 wherein an operator may provide additional operating constraints of power generation system 10; and a controller 84 configured (a) to receive input corresponding to any additional operating constraints (FIG. 2, step 202) and to obtain component operating parameters of the power generation system (FIG. 2, step 203), (b) to generate input profiles of the GT, the HRSG and the ST that satisfy the nominal constraints and any additional constraints provided by the operator, and (c) to generate the information about the predicted operating parameters of the power generation system (FIG. 2, step 204). In one example, the component parameters comprise values obtained by sensors such as thermocouple sensors (not shown) of ST 20, temperature sensors (not shown) for exhaust gasses of GTs 16 and 116, and/or pressure transducers of ST 20, for example. In another example, component parameters may be obtained from calculations based on values obtained by such sensors.

FIG. 2 is for purposes of illustration only. For example, the steps need not be performed in the exact order shown, and the illustrated iteration loop is optional but believed to be beneficial. In a more specific embodiment, it is beneficial for controller 84 to be further configured, while generating the input profiles, to optimize at least one power generation system operating parameter. For example, a technique such as the model predictive control of aforementioned US20070055392 may be used. The MPC methodology uses models for the GT, HRSG, ST and other combined-cycle power generation system components, sensor information, and an efficient online optimizer to generate optimal startup profiles for each GT throughout the pre-specified loading sequence while maintaining a safe operation. For example, using the component operating parameters, the models may predict system dynamics and explore effects of current control actions (GT loads) with respect to future constraints. In one embodiment, the optimizer uses the models to pose and solve an optimization problem online which generates optimal input profiles that satisfy all the constraints in the power generation system. At each control step, an optimization problem is formed and solved to calculate the optimal control action for the following step. Then, a new set of sensor measurements is used to obtain the component operating parameters and adjust model parameters to maximize accuracy in the predicted dynamics. After this adjustment, a new optimization problem is formed, and the process may be repeated. The algorithm may be designed and optimized for execution on a real-time control system.

Nominal or operating constraints may include constraints from a variety of sources. Such constraints typically at least include certain physical constraints on the power generation system components but may optionally further include performance requirements relating to compliance with government regulations or operator commands. Such constraints may either be in terms of maximum limits or minimum limits, depending upon the nature of the constraint. Several examples of physical nominal operating constraints include stresses or rates of change of stresses in the ST rotor, differential expansion or clearances between adjacent rotating and stationary parts, and metal and steam temperatures or rates of change of temperatures. Several examples of additional operating constraints include changes to the aforementioned nominal constraints as well as new constraints such as isotherm constraints, HRSG constraints, and additional steam drum stress constraints, for example.

The predicted operating parameter may comprise any desired parameter or parameters and will typically be parameters selected to provide desired information for the operator to consider when providing any additional operating constraints. For example, the predicted operating parameter may comprise a predicted GT load, rotor stress values of the ST, GT exhaust temperatures, a partial start up time, a total start up time, an emissions production, fuel consumption, an expense, ambient temperature, available steam, component temperatures, component pressures, or a combination thereof. In another embodiment, as will be discussed in more detail below, controller 84 is configured to generate information regarding alternative scenarios, and the display is configured to show such information regarding the alternative scenarios.

Embodiments disclosed herein may be used for power generation systems with a single GT or a plurality of GTs and are believed to be particularly useful when the GT comprises a plurality of GTs and the HRSG comprises a plurality of HRSGs. In such embodiments, controller 84 is configured to generate input profiles for each of the GTs and the HRSGs. In one exemplary embodiment, user interface 94 is configured so that an operator may provide commands regarding a number of GTs to start, an order of starting the GTs, blending types (connection) of HRSGs to the ST, load levels for blending of the GTs, or a combination thereof. In such embodiments, it is useful to have the predicted operating parameter comprise a time to reach to a blending point, a time to complete a blending, a time to reach a desired load, an isotherm condition, or a combination thereof, for example.

In another embodiment user interface 94 is configured so that an operator may provide commands regarding a performance requirement, and controller 84 is configured to receive the performance requirement and use the performance requirement when generating the input profiles. The performance requirement may comprise requirements such as a start up time, an emissions production, fuel consumption, net heat rate, or a combination thereof, for example. Controller 84 may be configured to use the performance requirement to generate a recommended start up sequence. In another embodiment, the user interface is adaptable so that the operator may change the performance requirement if desired. This option is beneficial because total start up times of combined cycle power generation systems sometimes occur over a period of three hours to four hours and requirements may change during this time period.

Figure 3:
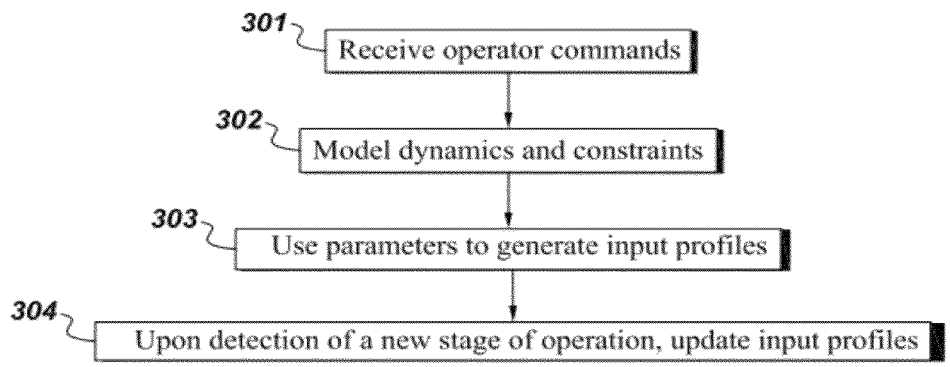
FIG. 3 is a flow diagram in accordance with one aspect disclosed herein.

Another control embodiment is illustrated by FIGS. 1 and 3. This embodiment may be used separately or in combination with the embodiment of FIG. 2 and comprises user interface 94 wherein the operator may provide commands regarding a number of GTs to start, an order of starting the GTs, blending types of HRSGs to the ST, or a combination thereof (FIG. 3, step 301). Also included is a model 88 for the GTs, the HRSGs, and the ST with the model being configured to represent dynamics and constraints using a plurality of parameters (FIG. 3, step 302) and an optimizer 90 configured to receive input corresponding to the parameters and to generate input profiles of the GTs, the HRSGs, and the ST that satisfy the constraints and optimize at least one power generation system operating parameter (FIG. 3 Step 303). In the embodiment of FIG. 3, optimizer 90 is further configured to detect a stage transition of power generation system operation and update the input profiles (FIG. 3, step 304). One example of a stage transition is a connecting or a disconnecting of an HRSG to the ST. A benefit of stage transition detection is that optimizer 90 may automatically reconfigure the profiles for improved performance. Stage changes may be detected by obtaining and evaluating data from sensors (not shown) such as steam valve position sensors, isolation valve sensors, bypass valve sensors, GT exhaust temperature sensors, HRSG power sensors, or power generation system power sensors, for example.

Figure 4:
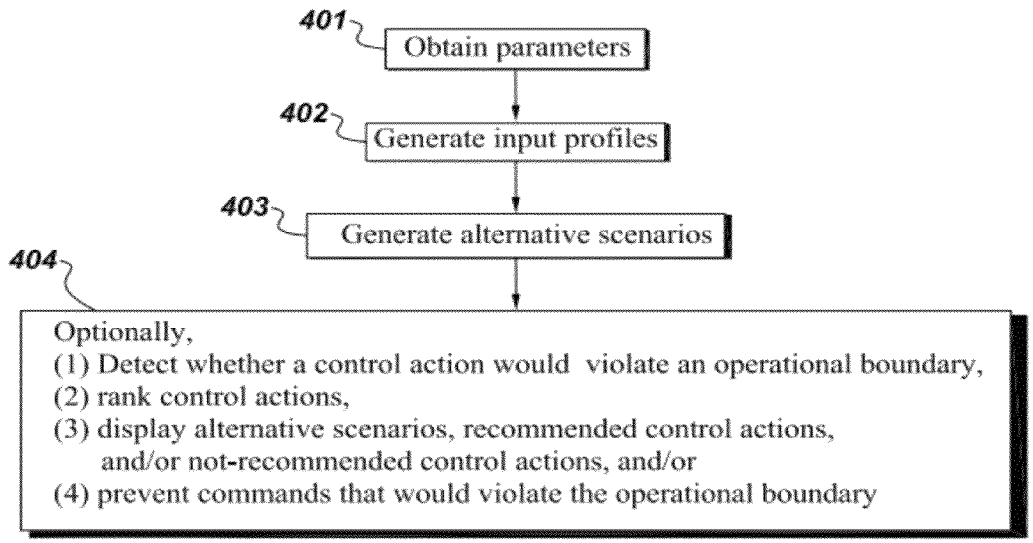
FIG. 4 is a flow diagram in accordance with one aspect disclosed herein.

Still another control embodiment is illustrated by FIGS. 1 and 4. This embodiment may be used separately or with either or both of the embodiments of FIGS. 2 and 3. In the embodiment of FIG. 4, controller 84 is configured to: obtain component parameters of the power generation system (FIG. 4, step 401), generate input profiles of the GTs, the HRSGs, and the ST (FIG. 4, step 402), and generate alternative operating scenarios by mapping alternative control actions to an operating constraint of at least one of the GTs, at least one of the HRSGs, the ST, or a combination of any of the foregoing (FIG. 4, step 403).

The operating scenarios are useful to help predict the longer term consequences of individual control actions. For example, in one embodiment, the alternative control actions include actions relating to HRSG blending. During the blending of an HRSG to the ST, the main control effectors are the isolation and bypass valves, and one of the main operating constraints is the allowable stress levels in the ST rotor. Typically, the time constants associated with the bypass and isolation valves are in the order of few seconds, while those of the ST rotor stresses are in the order of 10 to 20 minutes. During a combined cycle startup where multiple GT-HRSG pairs are present, the blending of an HRSG into the ST represents a control event that should be completed as soon as possible to avoid unnecessary waiting. The blending consists in the process of allowing (into the ST) the steam generated in an HRSG that is not currently connected to the ST. During this process, the isolation valves for that particular HRSG should be open, and the bypass valves should be closed to force the steam into the ST. If the power generation system is operating near an operating constraint like ST stresses, typical operating procedures may require waiting until the stresses in the ST rotor fall below a pre-specified level before the blending process is allowed. Using the multiple prediction approach for alternative control actions, the controller may simulate the non-blending and multiple blending events (that are triggered at different times) to determine what is the recommended time to perform the blending without future constraint violations. In this way, it is not necessary to wait for stresses to come below the pre-specified level to allow the blending event, resulting in significant time savings.

In another embodiment, the alternative control actions may include actions relating to if/when and how far to open an isolation valve and/or actions relating to GT loading across an isotherm. Some combined cycle power plants, for example, experience operating limitations denoted by isotherm constraints due, for example, to a limited steam attemporation capability. Isotherm constraints refer to limitations to dwell extended periods of time at GT loads corresponding to high exhaust temperatures. For example, in one embodiment, the isotherm temperatures are about 650° C., and the GT load range corresponding to the isotherm could range from thirty percent to forty percent on a 15° C. day; however, the load range of the operating region can be heavily dependent on ambient temperature. If isotherm constraints are present, a GT may be required to cross the isotherm region at a prescribed minimum load rate to avoid damage caused by high operating temperatures. The use of multiple predictions for crossing the isotherm at different times enables GT loading across the isotherm only when the analyses predict no future ST rotor overstress.

In one more specific embodiment designed to handle GT isotherm constraints, the alternative control actions comprise crossing the isotherm at different future times. In this embodiment, whenever the GT load approaches the isotherm region, the GT load is maintained while the control system simulates alternative isotherm crossing times and evaluates associated future ST rotor stresses. As a result of these analyses, the control system determines, in real-time, which isotherm crossing times would and would not result in ST overstress. In this way, the real-time analysis of alternative scenarios may be used to determine the earliest isotherm crossing time that is compliant with stress limitations.

In another more specific embodiment that is independent of the type of control action to be mapped, controller 84 is configured to simulate the alternative control actions, predict effects of the multiple alternative control actions on the operating constraints; and discriminate which of the multiple alternative control actions would and would not violate the operating constraints (FIG. 4, step 404). It may also be useful in some embodiments for the controller to be further configured to rank the alternative control actions. The selection of the alternative control action may either be automated by the controller or selectable by an operator. In one embodiment, display 92 is configured to display the alternative operating scenarios of the power generation system and the predicted effects of the alternative control actions, and user interface 94 is used by an operator who may provide a command regarding a number of GTs to start, an order of starting the GTs, and/or blending types of HRSGs to the ST. Controller 84 is then configured to use any such command to generate the input profiles. Controller 84 may be configured to determine a recommended control action, a not-recommended control action, or a combination thereof, and such information may also be displayed. In one exemplary embodiment, controller 84 is configured to prevent any initiation of (or override) an operator command that would violate an operating constraint or constitute a not-recommended control action, for example.

With display options, whether regarding the predicted operating parameters of FIG. 2 or the alternative operating scenarios and control actions of FIG. 4, an operator has more information available and is better suited to make available operator commands and dispatch power to an electrical grid. Furthermore, when the controller incorporates knowledge from simulation-based experience to determine the most appropriate startup sequence and connection types for different performance indexes, different initial conditions in the power generation system, and different environmental conditions in the site, the operator is relieved from making a multiplicity of decisions to configure the startup and is thus able to focus on the few decisions that depend on current market or dispatch conditions.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features. Exemplary embodiments of systems and methods for channeling steam into STs are described above in detail. The systems and methods illustrated are not limited to the specific embodiments described herein, but rather, components of the system may be utilized independently and separately from other components described herein. Further, steps described in the method may be utilized independently and separately from other steps described herein.

While only certain features of the invention have been illustrated and described herein, many modifications and changes will occur by those skilled in the art. It is, therefore, to be understood that the appended claims are intended to cover all such modifications and changes as they fall within the true spirit of the invention.

The invention claimed is:

1. A control system for a combined cycle power generation system comprising gas turbine engines (GTs), heat recovery steam generators (HRSGs), and at least one steam turbine (ST), the combined cycle power generation system having nominal operating constraints, the control system comprising:
   a display for providing an operator information about predicted operating parameters of the power generation system;
   a user interface for receiving from the operator (a) any additional operating constraints of the power generation system, and (b) any operator commands regarding a number of GTs to start, an order of starting the GTs, blending types of HRSGs to the ST, load levels for blending of the GTs, or a combination thereof;

a controller for (a) receiving input corresponding to any additional operating constraints (b) using sensors for obtaining component operating parameters of the power generation system, (c) generating input profiles of the GTs, the HRSGs, and the at least one ST that satisfy the nominal constraints and any additional constraints, (d) generating the information about the predicted operating parameters of the power generation system based on the input profiles and the component operating parameters, and (e) controlling a plurality of components required for a start-up of the combined cycle power generation system.

2. The control system of claim 1 wherein the controller is further configured, while generating the input profiles, to optimize at least one power generation system operating parameter.

3. The control system of claim 1 wherein the predicted operating parameter comprises a predicted GT load, a rotor stress values of the ST, a GT exhaust temperature, a partial start up time, a total start up time, an emissions production, fuel consumption, an expense, ambient temperature, available steam, a component temperature, a component pressure, or a combination thereof.

4. The control system of claim 1, wherein the user interface is configured so that an operator may provide commands regarding a performance requirement, and wherein the controller is configured to receive the performance requirement and use the performance requirement when generating the input profiles.

5. The control system of claim 4 wherein the performance requirement comprises an emissions production, fuel consumption, a net heat rate, a GT load, a rotor stress value of the ST, a GT exhaust temperature, a partial start up time, a total start up time, available steam, an expense, a component temperature, a component pressure, or a combination thereof.

6. The control system of claim 1 wherein the controller is configured to generate information regarding alternative scenarios and the display is configured to show the information regarding the alternative scenarios.

7. The control system of claim 1 wherein the predicted operating parameter comprises a time to reach a blending point, a time to complete a blending, a time to reach a desired load, an isotherm condition, or a combination thereof.

8. The control system of claim 1 wherein the controller is configured to detect a stage transition of power generation system operation and use information regarding the stage transition when generating the input profiles.

9. A control system for a combined cycle power generation system comprising gas turbines (GTs), heat recovery steam generators (HRSGs), and at least one steam turbine (ST), the system comprising:
a user interface for receiving any operator commands regarding a number of GTs to start, an order of starting the GTs, blending types of HRSGs to the ST, or a combination thereof;
a model for the GTs, the HRSGs, and the ST configured to represent dynamics and constraints using a plurality of parameters;
an optimizer configured to receive input corresponding to the parameters and to generate input profiles of the GTs, the HRSGs and the ST that satisfy the constraints and optimize at least one power generation system operating parameter,
wherein the optimizer is further configured to detect a stage transition of the power generation system operation based on information from sensors and to use the detected stage transition to update the input profiles, and wherein the stage transition comprises connecting or disconnecting of an HRSG from the HRSGs to the ST.

10. The control system of claim 9 wherein the user interface is configured so that an operator may provide commands regarding a performance requirement, and wherein the optimizer is configured to receive the performance requirement and use the performance requirement when generating the input profiles.

11. A control system for a combined cycle power generation system comprising gas turbines (GTs), heat recovery steam generators (HRSGs), and at least one a steam turbine (ST), the control system comprising:
a controller for
(a) obtaining component parameters of the power generation system from sensors,
(b) receiving any operator commands regarding a number of GTs to start, an order of starting the GTs, blending types of HRSGs to the ST, or combinations thereof;
(c) generating input profiles of the GTs, the HRSGs, and the at least one ST utilizing the component parameters and the operator commands, and
(d) generating alternative operating scenarios by mapping alternative control actions to an operating constraint of at least one of the GTs, at least one of the HRSGs, the ST, or a combination of any of the foregoing.

12. The control system of claim 11 wherein the alternative control actions include controlling flow of steam generated in the HRSGs into the ST.

13. The control system of claim 11 wherein the alternative control actions include controlling GT loading to enable the GT to cross an isotherm condition that is a part of the input profiles generated by the controller.

14. The control system of claim 11 wherein the controller is configured to
simulate the alternative control actions,
predict effects of the multiple alternative control actions on the operating constraint; and
discriminate which of the multiple alternative control actions would and would not violate the operating constraint.

15. The control system of claim 14 wherein the controller is further configured to rank the alternative control actions.

16. The control system of claim 14 further comprising a display configured to display the alternative operating scenarios of the power generation system and the predicted effects of the alternative control actions.

17. The control system of claim 16 wherein the controller is further configured to determine a recommended control action, a not-recommended control action, or a combination thereof and wherein the display is configured to display the recommended control action, the not-recommended control action, or the combination thereof.

18. The control system of claim 16 wherein the controller is configured to prevent any initiation of an operator command that would violate the operating constraints.

* * * * *

UNITED STATES PATENT AND TRADEMARK OFFICE
CERTIFICATE OF CORRECTION

Page 1 of 1

PATENT NO. : 8,352,148 B2
APPLICATION NO. : 12/124316
DATED : January 8, 2013
INVENTOR(S) : D'Amato et al.

It is certified that error appears in the above-identified patent and that said Letters Patent is hereby corrected as shown below:

On Page 2, in Field (56), under "OTHER PUBLICATIONS", in Column 2, Line 9, delete "T. lijima" and insert -- T. Iijima --, therefor.

In Column 4, Line 28, delete "a IP" and insert -- an IP --, therefor.

In Column 4, Line 33, delete "a IP" and insert -- an IP --, therefor.

In Column 6, Line 43, delete "UP" and insert -- HP --, therefor.

In Column 11, Line 2, in Claim 1, delete "constraints" and insert -- constraints, --, therefor.

In Column 12, Line 16, in Claim 11, delete "one a" and insert -- one --, therefor.

In Column 12, Line 23, in Claim 11, delete "thereof;" and insert -- thereof, --, therefor.

Signed and Sealed this
Nineteenth Day of March, 2013

Teresa Stanek Rea
*Acting Director of the United States Patent and Trademark Office*